US008630503B2

(12) United States Patent
Akiyama

(10) Patent No.: US 8,630,503 B2
(45) Date of Patent: Jan. 14, 2014

(54) IMAGE PROCESSING APPARATUS, IMAGE PROCESSING METHOD, AND COMPUTER PROGRAM

(75) Inventor: Yuji Akiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 924 days.

(21) Appl. No.: 12/485,533

(22) Filed: Jun. 16, 2009

(65) Prior Publication Data
US 2009/0324129 A1    Dec. 31, 2009

(30) Foreign Application Priority Data

Jun. 25, 2008  (JP) .................................. 2008-166255

(51) Int. Cl.
*G06K 9/40*     (2006.01)
(52) U.S. Cl.
USPC .............................. 382/254; 382/274; 382/275
(58) Field of Classification Search
USPC ................................................. 382/254, 275
See application file for complete search history.

(56) References Cited

U.S. PATENT DOCUMENTS

| 5,218,387 | A | 6/1993 | Ueno et al. ..................... 351/210 |
| 5,905,807 | A | 5/1999 | Kado et al. ..................... 382/118 |
| 6,611,613 | B1 * | 8/2003 | Kang et al. ..................... 382/118 |
| 6,885,760 | B2 | 4/2005 | Yamada et al. ................ 382/118 |
| 7,068,818 | B2 * | 6/2006 | Nishio et al. ................... 382/112 |
| 7,242,800 | B2 | 7/2007 | Iguchi et al. ................... 382/167 |
| 7,336,821 | B2 * | 2/2008 | Ciuc et al. ...................... 382/167 |
| 7,616,234 | B2 | 11/2009 | Iguchi et al. ............... 348/223.1 |
| 7,806,604 | B2 * | 10/2010 | Bazakos et al. ............... 396/427 |
| 8,295,637 | B2 * | 10/2012 | Lukac et al. ................... 382/274 |
| 8,368,755 | B2 * | 2/2013 | Nishida et al. ................. 348/148 |
| 2002/0001398 | A1 * | 1/2002 | Shimano et al. .............. 382/104 |
| 2005/0024498 | A1 * | 2/2005 | Iida et al. ..................... 348/207.2 |
| 2005/0063566 | A1 * | 3/2005 | Beek et al. ..................... 382/115 |
| 2005/0213796 | A1 * | 9/2005 | Ikoma et al. ................... 382/115 |
| 2005/0219393 | A1 * | 10/2005 | Sugimoto ................ 348/333.01 |
| 2005/0271245 | A1 * | 12/2005 | Ai et al. ......................... 382/100 |
| 2006/0066891 | A1 * | 3/2006 | Ikeda et al. ................... 358/1.15 |

(Continued)

FOREIGN PATENT DOCUMENTS

| EP | 0 552 770 | 7/1993 |
| JP | 5-197793 | 8/1993 |

(Continued)

OTHER PUBLICATIONS

Translation of JP 2973676 B2.*

(Continued)

*Primary Examiner* — Michelle Entezari
(74) *Attorney, Agent, or Firm* — Fitzpatrick, Cella, Harper & Scinto

(57) ABSTRACT

The image processing apparatus of the present invention is characterized by including an obtaining unit configured to obtain image data and a detection result of a main subject in the image data; a detecting unit configured to apply main subject detecting processing to the image data obtained by the obtaining unit; a coincidence determining unit configured to determine whether a detection result of the main subject obtained by the obtaining unit and a detection result of the main subject detected by the detecting unit coincide with each other; and a correction amount determining unit configured to determine an amount of correction to be applied to the image data in accordance with a determination result obtained by the coincidence determining unit. Image correction processing is performed in a determined correction processing manner.

7 Claims, 16 Drawing Sheets

(56) References Cited

U.S. PATENT DOCUMENTS

| | | | |
|---|---|---|---|
| 2007/0007384 A1* | 1/2007 | Sliwa, Jr. | 244/30 |
| 2007/0065134 A1* | 3/2007 | Sugimoto | 396/165 |
| 2007/0086761 A1* | 4/2007 | Okamoto | 396/14 |
| 2007/0098231 A1* | 5/2007 | Minato | 382/118 |
| 2007/0110321 A1* | 5/2007 | Okada et al. | 382/209 |
| 2007/0122010 A1* | 5/2007 | Kitamura et al. | 382/118 |
| 2007/0292038 A1* | 12/2007 | Takemoto | 382/240 |
| 2008/0056444 A1* | 3/2008 | Skatter et al. | 378/57 |
| 2008/0137944 A1* | 6/2008 | Marchesotti et al. | 382/167 |
| 2008/0181597 A1* | 7/2008 | Tamura | 396/164 |
| 2008/0192122 A1* | 8/2008 | Izawa | 348/207.99 |
| 2008/0205869 A1* | 8/2008 | Nose | 396/77 |
| 2008/0247650 A1* | 10/2008 | Amir et al. | 382/209 |
| 2009/0027357 A1* | 1/2009 | Morrison | 345/175 |

FOREIGN PATENT DOCUMENTS

| | | |
|---|---|---|
| JP | 8-77334 | 3/1996 |
| JP | 2541688 | 7/1996 |
| JP | 11-53525 | 2/1999 |
| JP | 11-250267 | 9/1999 |
| JP | 2000-132688 | 5/2000 |
| JP | 2000-235648 | 8/2000 |
| JP | 2001-216515 | 8/2001 |
| JP | 2002150287 A * | 5/2002 |
| JP | 2004-178211 A | 6/2004 |
| JP | 2004-215005 A | 7/2004 |
| JP | 2006318262 A * | 11/2006 |
| JP | 2007-282119 A | 10/2007 |
| JP | 2007-312206 A | 11/2007 |
| JP | 2008-090399 A | 4/2008 |
| JP | 2009193357 A * | 8/2009 |

OTHER PUBLICATIONS

Translation of JP 3549013B2.*

* cited by examiner

|  | tag NO. |
|---|---|
| TITLE | 0x010e |
| MAKER NAME | 0x010f |
| MODEL | 0x0110 |
| IMAGE DIRECTION | 0x0112 |
| WIDTHWISE RESOLUTION | 0x011a |
| HEIGHTWISE RESOLUTION | 0x011b |
| RESOLUTION UNIT | 0x0128 |
| SOFTWARE | 0x0131 |
| DATE AND TIME OF CHANGE | 0x0132 |
| WhitePoint | 0x013e |
| PrimaryChromaticities | 0x013f |
|  | 0x0211 |
| YCrCb Positioning | 0x0213 |
| ReferenceBlackWhite | 0x0214 |
| Copyright | 0x8298 |
| Exif INFORMATION offset | 0x8769 |

FIG.6

| | tag NO. | | tag NO. | | tag NO. |
|---|---|---|---|---|---|
| EXPOSURE TIME | 0x829a | FLASH | 0x9209 | SencingMethod | 0xa217 |
| LENS F VALUE | 0x829d | LENS FOCAL DISTANCE | 0x920a | FILE SOURCE | 0xa300 |
| EXPOSURE CONTROL MODE | 0x8822 | CAMERA INSIDE INFORMATION | 0x927c | SceneType | 0xa301 |
| ISOSpeedRatings | 0x8827 | UserComment | 0x9286 | CFAPattern | 0xa302 |
| Exif VERSION | 0x9000 | SubsecTime | 0x9290 | INDIVIDUAL IMAGE PROCESSING | 0xa401 |
| ORIGINAL SHOOTING DATE AND TIME | 0x9003 | SubsecTimeOriginal | 0x9291 | EXPOSURE MODE | 0xa402 |
| DIGITALIZATION DATE AND TIME | 0x9004 | SubsecTimeDigitized | 0x9292 | WHITE BALANCE | 0xa403 |
| MEANING OF EACH COMPONENT | 0x9101 | FlashPix VERSION | 0xa000 | DIGITAL ZOOM MAGNIFICATION | 0xa404 |
| IMAGE COMPRESSIBILITY | 0x9102 | COLOR SPACE INFORMATION | 0xa001 | 35mm-CONVERSION LENS FOCAL DISTANCE | 0xa405 |
| ShutterSpeedValue | 0x9201 | IMAGE WIDTH | 0xa002 | PHOTOGRAPHIC SCENE TYPE | 0xa406 |
| ApertureValue | 0x9202 | IMAGE HEIGHT | 0xa003 | GAIN CONTROL | 0xa407 |
| BrightnessValue | 0x9203 | RelatedSoundFile | 0xa004 | PHOTOGRAPHIC CONTRAST | 0xa408 |
| EXPOSURE CORRECTION AMOUNT | 0x9204 | ExifR98 EXTENSION INFORMATION | 0xa005 | PHOTOGRAPHIC SATURATION | 0xa409 |
| OPEN F VALUE | 0x9205 | FocalPlaneXResolution | 0xa20e | PHOTOGRAPHIC SHARPNESS | 0xa40a |
| SubjectDistance | 0x9206 | FocalPlaneYResolution | 0xa20f | PHOTOGRAPHIC CONDITION DESCRIPTION INFORMATION | 0xa40b |
| AUTOMATIC EXPOSURE PHOTOMETRY MODE | 0x9207 | FocalPlaneResolutionUnit | 0xa210 | CAMERA-TO-SUBJECT DISTANCE RANGE | 0xa40c |
| LIGHT SOURCE | 0x9208 | ExposureIndex | 0xa215 | | |

FIG.7

| | tag NO. | | tag NO. |
|---|---|---|---|
| PHOTOGRAPHY MODE | | IMAGE SIZE | |
| PHOTOGRAPHIC QUALITY | | PHOTOMETRY METHOD | |
| FOCUS MODE | | OPTICAL ZOOM STEP VALUE | |
| FLASH MODE | | TITLE | |
| FLASH STRENGTH | | FIRMWARE VERSION | |
| DISTANCE TO SUBJECT | | FILE NUMBER | |
| WHITE BALANCE | | OWNER NAME | |
| DIGITAL ZOOM | | CameraID | |
| SHARPNESS | | COLOR | |
| CONTRAST | | SLOW SYNC | |
| SATURATION | | Unknow | |
| CCD SENSITIVITY | | | |
| MACRO MODE | | | |
| SELF-TIMER | | | |
| CONTINUOUS-SHOOTING MODE | | | |

FIG.8

| CAMERA-SIDE DETECTION RESULTS | PRINTER-SIDE DETECTION RESULTS | PROCESSING WEIGHT |
|---|---|---|
| 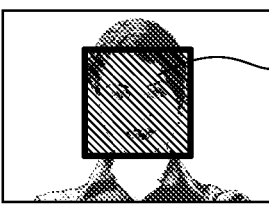 1201 | 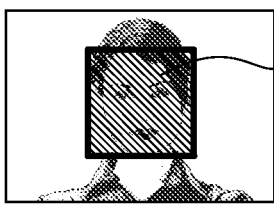 1201 | 1.0 |
| 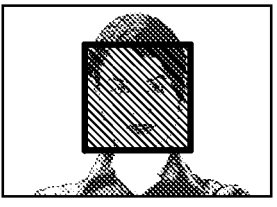 |  | 0.5 |
|  | 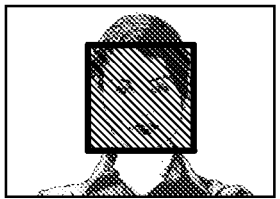 | 0.5 |
|  |  | 0 |
FIG.12

IMAGE PROCESSING APPARATUS, IMAGE PROCESSING METHOD, AND COMPUTER PROGRAM

BACKGROUND OF THE INVENTION

1. Field of the Invention

The present invention relates to an image processing apparatus and an image processing method for appropriately correcting image data. More specifically, the present invention relates to an image processing apparatus, an image processing method, and a computer program for detecting a main subject when photography is performed and detecting a main subject from image data relating to an image obtained by photography and correcting the image data.

2. Description of the Related Art

In recent years, many digital cameras or many printers having high quality photographic printing capability execute a process of analyzing and correcting a photographic image when photography or printing is performed. In particular, a face detecting function or an organ (e.g., eye) detecting function has received attention as a function performed to specify a person who is a main subject in a photographic scene or in an image. For example, in a digital camera, a face in the image is detected, and, as a result, an AF or an exposure is controlled in accordance with the detected face, and, in a printer, a correction for printing is controlled based on data concerning the detected face.

These circumstances have created an environment in which there is input equipment, such as a digital camera, or output equipment, such as a printer, or a PC that includes a highly complex application having a face detecting function.

However, the term "face detecting function" actually has various specifications and features.

For example, a digital camera that has captured an image detects a face during photography, and hence the face is detected as being used for a dynamic image. Therefore, the digital camera employs face detection algorithms and face detection parameters that are required to have a real time capability and a tracking capability with respect to a face region. In particular, the face is detected in combination with an exposure correction during photography. Therefore, for example, in a backlighted scene in which the face is dark, exposure is increased when detection processing is performed, so that the face can be easily detected. On the other hand, in a bright scene, exposure is decreased when detection processing is performed, so that the face can be detected while dynamically changing an input image.

Additionally, the face is detected in combination with an acceleration sensor or with an angle sensor. As a result, the face is detected while limiting a face-detecting direction to an upward direction in which the camera is pointed for photography, and hence detection time can be shortened. Additionally, a user focuses a camera and performs a field angle adjustment and a focus adjustment while seeing face-detection results shown on a viewfinder or on a liquid crystal display, and hence, a satisfactory performance can be maintained in an image detection technique that is not highly accurate. When photography is performed, the user can also determine whether false detection has been performed, and hence, advantageously, the number of such false detecting operations can be finally reduced. Still additionally, since information about a camera-to-subject distance, a focal point, etc., can be immediately observed, total face detection performance can be increased by feeding back this information for face detection.

On the other hand, unlike the digital camera, generally, a printer performs face detection based on data about a still image when an image is output from the printer, and the printer is not required to have a real-time capability. Additionally, since the printer cannot use all information obtained from the focusing like a digital camera, much time is liable to be consumed for detection processing. Therefore, the printer also controls parameters of a face detector while using information of an Exif (Exchangeable image file format) tag on which various pieces of control information of the digital camera obtained when photography is performed are written.

A dominant feature of face detection performed by the printer resides in the fact that a face can be detected while changing a face detection direction or changing a face size little by little because the printer is not required to have a real-time capability.

Additionally, the printer can easily detect a face position, a face size, a face direction, etc., in more detail although the digital camera is merely required to be capable of roughly detecting the face position. Additionally, if processing is performed by, for example, a PC (Personal Computer) having high performance processing, the face can be detected with higher accuracy than in the digital camera.

An environment has been improved in which various equipment, especially both an input device (e.g., digital camera) and an output device (e.g., printer), include a function, such as a face detecting function, to detect a region (i.e., part of a person) to specify a person in image data, and in which these devices differ in their detection performance. Hereinafter, the "region (part of a person) to specify a person" will be referred to as the "main subject."

To finally obtain a desired image, which is an output result from an output device, by applying optimum correction processing, it is important to more correctly detect a region that is photographically identified with that of a person (for example, a main subject that is a face region). To achieve this, it is possible to increase the detection performance of a region by which a person is specified, such as face detection performance, of the output device. However, increasing the detection performance will cause complications of processing and cause an increase in the processing load. In addition to this problem, a case arises when a main subject is difficult to detect except when an image is obtained by an input device. Therefore, a proposal has been made to employ a technique that uses results of a main-subject detecting function (e.g., face detecting function) installed in both the input device and the output device. This technique makes it possible to more accurately ascertain a person-specifying region (i.e., main subject).

However, if there is a difference between a detection result of the main subject obtained in the input device and a detection result thereof obtained in the output device, problems have occurred in subsequent processing. For example, if a face region cannot be accurately ascertained, disadvantages will arise. For example, the application of inappropriate correction processing will produce an extremely dark or bright image or will cause the loss of color balance. Therefore, strong correction cannot be performed due to the possibility of causing a great change. Therefore, to decrease the influence of these disadvantages, a conventional technique has been required to perform low-level processing at less than a desirable level of correction.

Additionally, as mentioned above, the input device and the output device differ from each other in detection characteristics and in the purpose of use of detection results, and hence a case arises in which a difference in the face detection rate, a difference in the false detection rate, and a difference in the detection performance of a face region are caused. In other words, there is a case in which the detection rate of a region (main subject) to specify a person, the detection performance shown when this region is detected, or the false detection rate is fixed depending on each device.

Therefore, if there is a difference between the detection result of the input device and that of the output device, the problem of whether priority is given to the detection result of the input device or to that of the output device or the problem of how to blend both results together so as to obtain a region (main subject such as a face region) more suitable to be used for correction will be caused.

The present invention has been developed in consideration of these problems. It is therefore an object of the present invention to provide an image processing apparatus and an image processing method capable of appropriately performing correction processing by use of each detection result of a main subject obtained by different devices.

SUMMARY OF THE INVENTION

The image processing apparatus of the present invention is characterized by including an obtaining unit configured to obtain image data and a detection result of a main subject in the image data; a detecting unit configured to apply main subject detecting processing to the image data obtained by the obtaining unit; a coincidence determining unit configured to determine whether a detection result of the main subject obtained by the obtaining unit and a detection result of the main subject detected by the detecting unit coincide with each other; and a correction amount determining unit configured to determine an amount of correction to be applied to the image data in accordance with a determination result obtained by the coincidence determining unit.

Additionally, the image processing method of the present invention is characterized by including an obtaining step of obtaining image data and a detection result of a main subject in the image data; a detecting step of applying main subject detecting processing to the image data obtained by the obtaining step; a coincidence determining step of determining whether a detection result of the main subject obtained by the obtaining step and a detection result of the main subject detected by the detecting step coincide with each other; and a correction amount determining step of determining an amount of correction to be applied to the image data in accordance with a determination result obtained by the coincidence determining step.

In the present invention, a main subject can be ascertained more accurately by using a first main-subject detection result (for example, before photography) and a second main-subject detection result (for example, when printed), and the result can be reflected in appropriate correction processing.

Further features of the present invention will become apparent from the following description of exemplary embodiments (with reference to the attached drawings).

BRIEF DESCRIPTION OF THE DRAWING

FIG. 6 is a drawing of an example of main information items of an Exif file that is a file example of image data according to the embodiment of the present invention;

FIG. 7 is a drawing of an example of sub-information items of an Exif file that is a file example of image data according to the embodiment of the present invention;

FIG. 8 is a drawing of an example of information items unique to a maker of an Exif file that is a file example of image data according to the embodiment of the present invention;

FIG. 12 is a view that illustrates a relationship between processing weight and face detection results of the digital camera and the printer according to the embodiment of the present invention;

DESCRIPTION OF THE EMBODIMENTS

Figure 1:
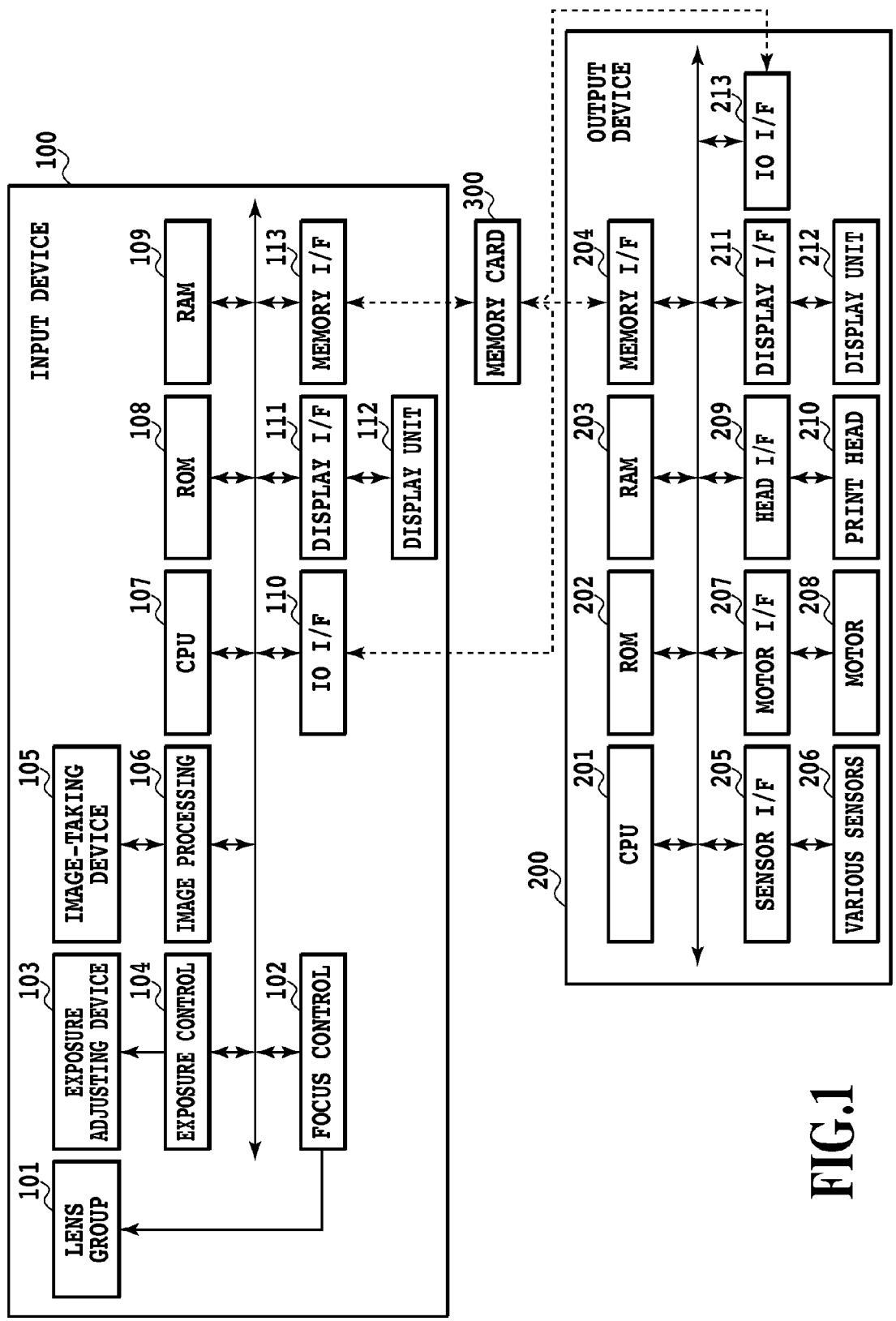
FIG. 1 is a block diagram that illustrates a schematic structure of a direct printing system according to an embodiment of the present invention.

Embodiments of the present invention will be hereinafter described in detail with reference to the attached drawings. The same reference numeral is given to an element having the same function in the drawings described below, and a description of the element having the same function is omitted.

FIG. 1 is a schematic block diagram of a direct printing system according to this embodiment.

The direct printing system includes a digital camera 100 and a printer 200. Image data obtained by taking photographs with the digital camera 100 are transmitted by a memory card 300 or by the connection of an I/O interface 110 of the digital camera 100 and an I/O interface 213 of the printer 200 through a cable or wireless LAN.

Reference numeral 101 designates a lens group, and reference numeral 103 designates an exposure adjusting device that includes a diaphragm and a shutter device.

Reference numeral 105 designates an image-taking device that converts a beam of light, which is an image of a subject and which has passed through the lens group 101 and through the exposure adjusting device 103, into an electrical signal. A CCD (Charge Coupled Device) or a CMOS (Complementary Metal Oxide Semiconductor) sensor can be used as the image-taking device 105. The image-taking device 105 performs clamp processing, gain processing, etc., for the output of an analog signal of the CCD or the CMOS sensor, then performs analog/digital (A/D) conversion by which the analog signal is converted into a digital signal, then performs pixel interpolation processing and color conversion processing, and outputs the signal in the form of photographic data (photographic image data).

A focus control 102 controls the lens group 101 in accordance with AF (Auto Focus) processing by a TTL (Through The Lens) method.

An exposure control 104 controls the exposure adjusting device 103 by performing AWB (Auto White Balance) processing by the TTL method.

An I/O IF (Input/Output Interface) 110 provides an input/output function of the digital camera 100. The I/O IF 110 provides a connection function for a connection to external equipment, such as operation buttons, USB (Universal Serial Bus), and wireless LAN (Local Area Network). The operation buttons are made up of a power button, a mode switch button, a shutter button, an input unit capable of setting various functions, etc. These operation buttons enable a user to arbitrarily control and operate the digital camera 100.

A display I/F 111 controls a display unit 112 that displays a preview of a photographed image, an operation menu, etc. A display device, such as a liquid crystal display, is used as the display unit 112.

A CPU (Central Processing Unit) 107 controls the digital camera 100 while executing various programs stored in a ROM (Read Only Memory) 108. A RAM (Random Access Memory) 109 is used as a storage function to store data temporarily needed at this time.

A memory I/F 113 controls a connector of the memory card 300, data reading, and data writing. It is recommended to use a data storage device having a nonvolatile memory function, such as a CF (Compact Flash) memory card or an SD (Secure Digital) memory card, as the memory card 300. In particular, photographic data about a photographed image is stored in the memory card 300. As a result, the photographic data can be stored in a state in which the power of the digital camera 100 is in an off state, and can be used by allowing other devices to read the data of the memory card 300.

In image processing 106, a main subject is detected from image information converted into digital data by the image-taking device 105.

A description is given below on the assumption that the "main subject" mentioned here is a face of a person. In this description, the main subject is a region showing a part of a person used to specify (extract) a person appearing on an image. The main subject can also be defined as an organ region, such as eyes, besides the face region.

Many techniques disclosed by, for example, Japanese Patent Publication Nos. H08-077334(1996), 2001-216515, H05-197793(1993), H11-053525(1999), 2000-132688, 2000-235648, and H11-250267(1999) and by Japanese Patent No. 2541688 have been proposed as a method for detecting a face position and an organ position by the image processing 106. In this embodiment, any one of these techniques may be used. Additionally, the method for detecting a face position and an organ position is not limited to those mentioned above, and any method other than those mentioned above may be used. Although the conventional method for detecting a face position and an organ position has been disclosed by various documents, this is not an essential part of the present invention, and hence a detailed description of this is omitted here.

Likewise, in the printer 200, a CPU (Central Processing Unit) 201 controls each function described later while executing programs stored in a ROM (Read Only Memory) 202. A RAM (Random Access Memory) 203 is used as a storage function to store data temporarily needed at this time.

A sensor I/F 205 provides the interface function of various sensors 206 used in the printer 200. The sensors 206 are made up of a paper feed sensor that measures the conveyed amount of printing paper, a head position sensor that measures the position of a print head, a sensor for detecting an amount of ink remaining in the printer, etc.

A motor I/F 207 provides the interface function of various motors 208 used in the printer 200. The motors 208 include a conveyance motor to convey printing paper, a head motor to move a print head, etc.

A head I/F 209 provides the interface function of a print head 210 used in the printer 200. The print head 210 has many nozzles each of which ejects ink having a specific color, and is used to form a printed image on a sheet of printing paper by controlling ejected patterns of the ink.

A display I/F 211 controls a display unit 212 that displays various conditions, such as inputting/setting conditions of the printer 200, operation menus, etc. A display device, such as a liquid crystal display, is used as the display unit 212.

An I/O IF 213 provides an input/output function of the printer 200. The I/O IF 213 provides a connection function for a connection to external equipment, such as operation buttons, USB, and wireless LAN. The operation buttons are made up of a power button, a print button, a copy button, an input unit capable of setting various functions, etc. These operation buttons enable a user to arbitrarily control and operate the printer 200.

A memory I/F 204 provides the same function as the memory I/F 113 of the digital camera 100. Mainly, this can be used to allow the printer 200, which is a second image processing apparatus, to read and print image data obtained by the digital camera 100, which is a first image processing apparatus.

Figure 2:
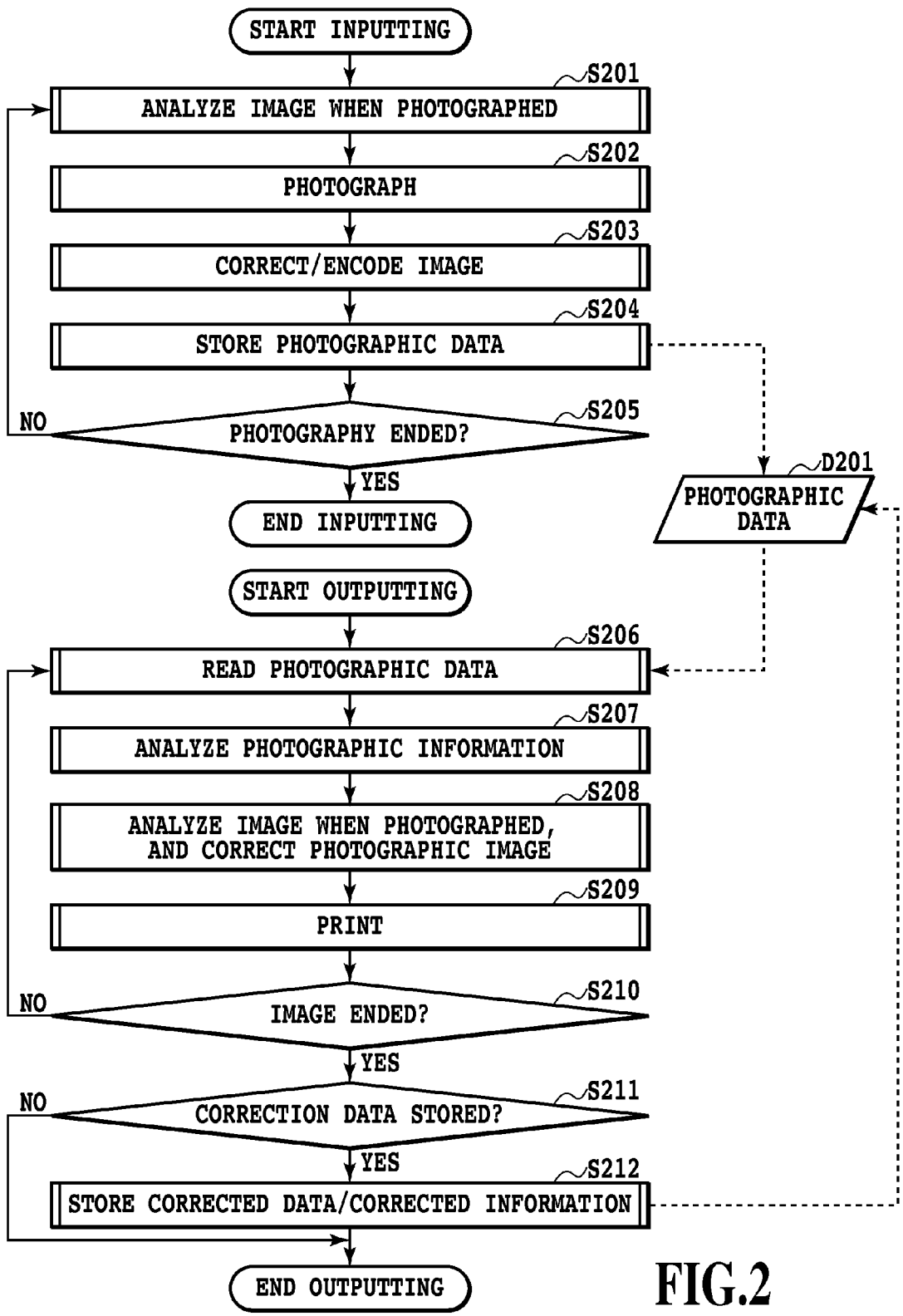
FIG. 2 is a flowchart that illustrates the entire processing of the direct printing system according to the embodiment of the present invention.

FIG. 2 shows a typical operational flow of the direct printing system of FIG. 1.

In this embodiment, the following operation is assumed as a typical operation. In detail, image data (hereinafter, referred to as "photographic image data" in this embodiment) is generated from an image photographed with the digital camera 100 operated by a user, and is read and printed by the printer 200.

In step S201, based on, for example, an operation by the user, the CPU 107 analyzes an image photographed with the digital camera 100.

The user operates the digital camera 100, and can confirm whether photographic conditions for a focal point or for an exposure have been adjusted while seeing a subject through a viewfinder or seeing an image displayed on the liquid crystal display. Before photographing, the digital camera 100 executes face detection (main-subject detection) of a person, which is one function of an analysis of an image formed on the image-taking device 105 by the image processing 106. A person (portrait) priority mode is provided in which a focus adjustment, an exposure adjustment, and a shutter speed adjustment suitable for the face of the person that is a main subject are automatically carried out thereafter.

Figure 3:
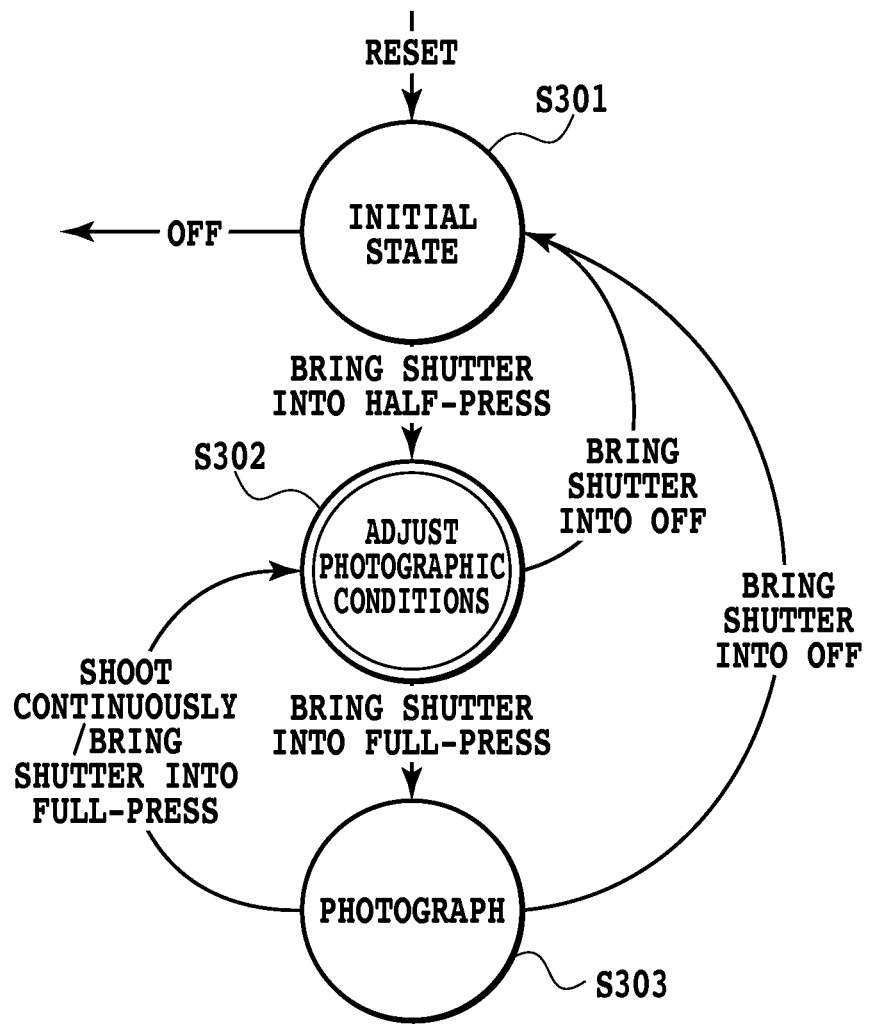
FIG. 3 is a view that illustrates a change in state of a digital camera when a photographic image is analyzed according to the embodiment of the present invention.

FIG. 3 illustrates a change in state of the digital camera 100 when an image analysis is made during photography in step S201.

When the power source of the digital camera 100 is turned on or when the digital camera 100 is reset during a photographing mode, the process of the digital camera 100 proceeds to an initial state step S301. When the shutter button reaches a half-press state, the process of the digital camera 100 proceeds to a photographic condition adjustment step S302. When the shutter button reaches a full-press state in the photographic condition adjustment step S302, the process of the digital camera 100 proceeds to a photography step S303.

The photography step S303 corresponds to a photographing step (S202), an image correcting/encoding step (S203), and a photographic data (photographic image data) storing step (S204) of FIG. 2. If a continuous shooting mode is selected in the photography step S303 or if the shutter button is in a full-press state for a longer period than a predetermined period of time in the photography step S303, the process of the digital camera 100 again returns to the photographic condition adjustment step S302, where photographic conditions are adjusted. If the shutter button is turned off in the photographic condition adjustment step S302 and the photography step S303, the process of the digital camera 100 returns to the initial state step S301, where a next operation is awaited.

Figure 4:
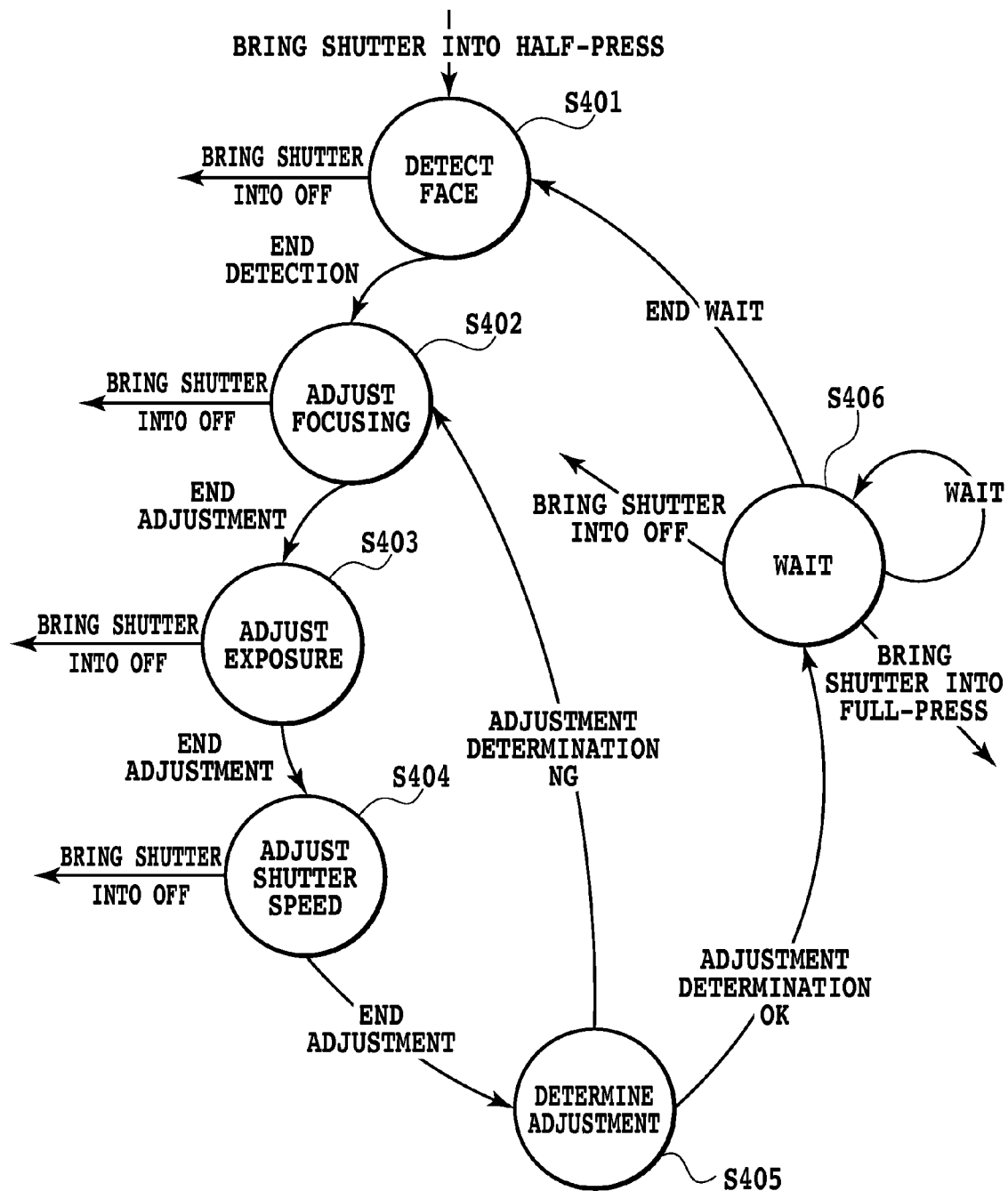
FIG. 4 is a view that illustrates a change in state of the digital camera when photographic conditions are adjusted according to the embodiment of the present invention.

FIG. 4 illustrates details of the photographic condition adjustment step S302. Referring to FIG. 4, a description will be given of a process of determining photographic conditions in the person priority mode.

In the photographic condition adjustment step S302, if the digital camera 100 performs photography in the person (portrait) priority mode, the process of the digital camera 100 first proceeds to a face detection step S401, where a face is detected. Based on a face detection result, the process proceeds to a focus adjustment step S402 regardless of the fact that the face has been detected or has not been detected. If the result that the face has been detected is shown in the face detection step S401, the CPU 107 controls the focus control 102 and operates the lens group 101 so as to be focused on the position of the face in the focus adjustment step S402 based on the face detection result. If the result that the face has not been detected is shown in the face detection step S401, the lens group 101 is operated, and focus processing is performed by AF processing according to the TTL method. If the focus adjustment step S402 is completed, the process of the digital camera 100 proceeds to the next step, i.e., exposure adjustment step S403.

In the exposure adjustment step S403, the CPU 107 operates the exposure adjusting device 103 while controlling the exposure control 104 by AWB processing in which priority is given to the face if the face has been detected or by AWB processing according to a normal TTL method if the face has not been detected. If the exposure adjustment step S403 is completed, the process of the digital camera 100 proceeds to the next step, i.e., shutter adjustment step S404. In the shutter adjustment step S404, the CPU 107 receives an adjustment result obtained in the focus adjustment step S402 and an adjustment result obtained in the exposure adjustment step S403, and calculates an optimal shutter speed. Based on the resulting shutter speed, time to receive a beam of light of the image-taking device 105 is determined. If the shutter adjustment step S404 is completed, the process of the digital camera 100 proceeds to an adjustment determination step S405.

The CPU 107 determines the entire photographic conditions in the adjustment determination step S405. If an affirmative adjustment determination is made, the process proceeds to a Wait step S406. If a negative adjustment determination is made, the process proceeds to the focus adjustment step S402, where the photographic conditions are again adjusted. If the shutter button reaches a full-press state by the time a predetermined period of time elapses in the Wait step S406, the process proceeds to the photography step S303. If a predetermined period of time of a waiting state elapses, the process again proceeds to the face detection step S401, where the adjustment of the photographic conditions is restarted. If the shutter button is turned off during the continuation of all states, the process proceeds to the initial state step S301, where the push of the shutter button is awaited.

If photography is performed in the person priority mode, the image-taking device 105 converts a beam of light, which is an image of a subject, into an electrical signal in step S203, and generates photographic data (photographic image data) by performing clamp processing, gain processing, digital conversion processing, pixel interpolation processing, and color conversion processing. This photographic data is stored in the RAM 109. Thereafter, in the image processing 106, a face region is detected from the photographic data, and, based on the detected face region, a face detection result is obtained.

The following description is given on the assumption that an "Exif" file format (Ver. 2.2), which is a typical image file format generally used in the market, is used as a method for recording the photographic data stored in the RAM 109.

Figure 5:
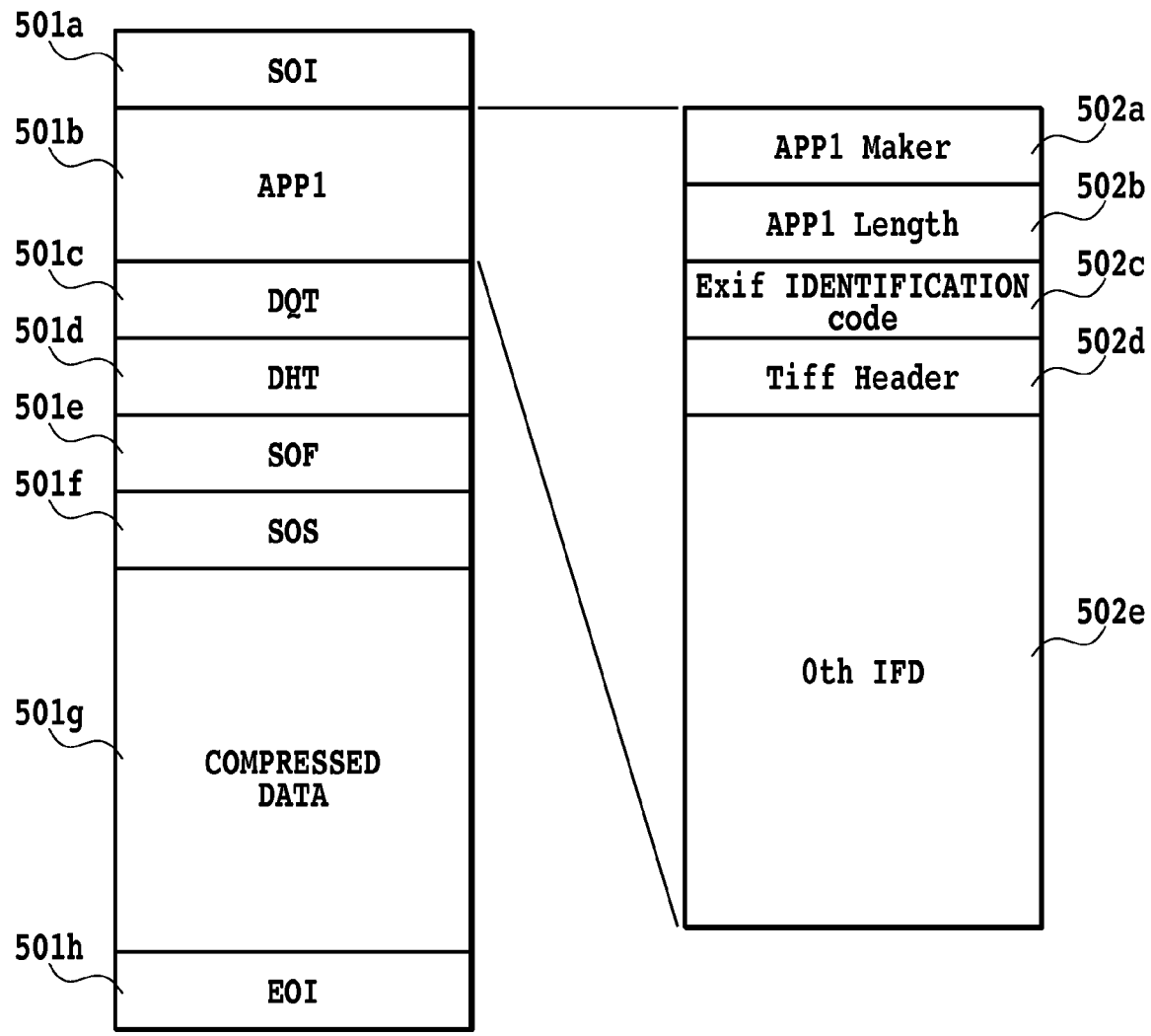
FIG. 5 is a structural drawing of an Exif file that is a file example of image data according to the embodiment of the present invention.

FIG. 5 is a view that illustrates a structure of an Exif file that is an example of a method for recording photographic data according to this embodiment.

The structure of an Exif image is basically a commonly-used JPEG image format. Data, such as thumbnail image data or photography-related data, is embedded therein in accordance with JPEG regulations. An Exif image file can be seen as a commonly-used JPEG image file by using an Internet browser, an image viewer, or photo-retouching software that supports the JPEG format.

As shown at the left-hand side of FIG. 5, the JPEG file has SOI (Start of image/0xFFD8) 501a arranged at the top. Subsequent to this, APP1 501b, DQT (Define Quantization Table) 501c, and DHT (Define Huffman Table) 501d are arranged in this order. Subsequent to these, SOF (Start of Frame) 501e, SOS (Start of Stream) marker 501f, and compressed data (data) 501g are arranged in this order. At the end, EOI (End of Image) 501h is arranged.

DQT 501c denotes the actual condition of a quantization table, and DHT 501d denotes the actual condition of a Huffman table. SOF 501e denotes the start of a frame, SOS marker 501f denotes the start of image data, and EOI 501h denotes the end of the image file.

Among markers used in JPEG, markers of from 0xFFE0 to 0xFFEF are referred to as "application marker," and are not required to decode a JPEG image. However, each of these markers is defined as a data area for use in each application program.

In Exif, the marker "APP1 (0xFFE1)" is used to store photographic conditions and the like in a JPEG image. The structure of "APP1" is shown at the right-hand side of FIG. 5. In detail, the structure of "APP1" has APP1 Marker (0xFFE1/2 byte) area 502a arranged at the top. Subsequent to this, an APP1 Length area (2-byte APP1 area) 502b and an APP1 data area 502c are arranged in this order.

The first six bytes of data subsequent to the APP1 data area 502c are "Exif" of ASCII characters serving as an identifier and 2-byte "0x00" subsequent thereto. Therefrom, data in Tiff (Tagged Image File Format) format is stored. The first eight bytes in a Tiff format make Tiff Header area 502d, in which the first two bytes define a byte-arrangement format. 0x4d4d: "MM" denotes a Motorola format, and 0x4848: "II" denotes an Intel format.

The first IFD (Image file directory) is stored in a 0th IFD (IFD of main image) area 502e subsequent to the Tiff Header area 502*d*. Normally, main image data and image-related data are stored in this, and items consisting of main information, sub-information (Exif SubIFD/0x8768), and unique-to-maker information (Maker note/0x827c) are written separately from each other.

FIG. 6 is a drawing that illustrates an example of a "tag" address showing the description contents and description arrangement of main information.

As shown in FIG. 6, general information, such as title, maker name and model name of the digital camera 100, image direction, widthwise resolution, heightwise resolution, resolution unit, software, and date and time of change, are written as main information.

FIG. 7 illustrates an example of a "tag" address showing the description contents and description arrangement of sub-information.

As shown in FIG. 7, detailed information on the digital camera 100, such as light source and lens focal distance, and various photographic conditions, such as exposure time F value, ISO sensitivity, and automatic exposure photometry mode, are written as sub-information.

FIG. 8 illustrates a description example of maker-dependent data.

The description contents of the maker-dependent data, which is data unique to a maker, "tag" address, etc., can be peculiarly set in each maker, and hence various forms are employed. Photography-related data that is not defined in sub-information is apt to be written. At the present time, standards according to which face detection results are written onto an Exif tag are not at all fixed. Therefore, in this embodiment, let it be supposed that face detection results are stored in maker-dependent data.

Accordingly, in this embodiment, pieces of information (face detection results) showing results obtained by detecting a face that is a first main subject photographed with the digital camera 100 are contained in photographic data. Therefore, the printer 200 is capable of obtaining a face detection result detected by the digital camera 100 from photographic data obtained from the digital camera 100.

Figure 9:
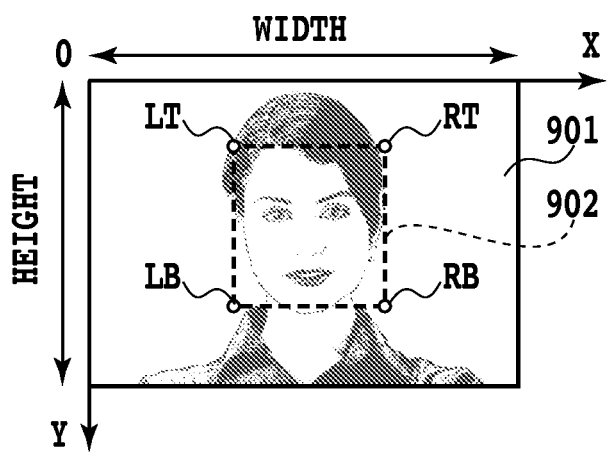
FIG. 9 is a view that illustrates a detection example of a main subject (e.g., face) according to the embodiment of the present invention.

The face detection result is expressed as having a positional relationship shown in FIG. 9. In other words, the face detection result is information used to show whether a subject detected in a predetermined area of image data is a face or not. Therefore, the use of a face detection result makes it possible to confirm that a face has been detected in a predetermined area of image data in an apparatus, from which the face detection result has been output, by another apparatus. In FIG. 9, the face detection result is coordinate information that corresponds to a detected face region. Therefore, if coordinate information that is a face detection result is contained, it can be said that the region surrounded by coordinates obtained from this coordinate information is a face region.

In FIG. 9, reference numeral 901 designates an image part of general photographic image data D201, and, in this image part, there is image data obtained when photography is performed. The image part 901 is formed of pixels having a predetermined width and a predetermined height. The image part 901 depicts a person photographed with the camera, and shows a state in which a face has been detected by the face detection result. The letter X represents an abscissa axis, and the letter Y represents an ordinate axis. The origin (0,0) is fixed at the upper left.

In FIG. 9, the face of the person is expressed as falling within the region indicated by reference numeral 902.

In this embodiment, the face region is surrounded by the coordinates of four points, i.e., upper left (LT), upper right (RT), lower left (LB), and lower right (RB). Each of the four points can be expressed by two-dimensional coordinates (x, y). Therefore, an image processing apparatus, such as a digital camera, a printer, or a PC, can obtain a face detection result by obtaining the coordinate information of the four points LT, RT, LB, and RB of the region extracted as a face region during face-region detecting processing.

To express a face region, another expression method, such as a method using a center and a size or a method using a central point, a width, and a height, can be employed in this embodiment.

Additionally, it is possible to cope with the detection of a plurality of faces if each face region is managed by being given an identification number, i.e., if each face detection result obtained as above is managed by being given an ID number.

In step S204, the CPU 107 stores photographic image data D201 stored in the Exif file format in step S203 in the memory card 300 via the memory I/F 113. A user removes the memory card 300 in which the photographic image data D201 is stored from the digital camera 100, and inserts the memory card 300 into the memory card I/F 204 of the printer 200. As a result, the photographic image data D201 can be used in the printer 200.

Thereafter, in step S205, the CPU 107 determines whether photography has been completed. If photography has not been completed, the process returns to step S201. If the CPU 107 determines that photography has been completed, processing to obtain the image data in the digital camera 100 (i.e., inputting the image data into to the system) is ended.

The printer 200 reads and obtains the photographic image data D201 stored in the memory card 300 in step S206. At this time, a UI (User Interface) that urges a user to perform operations is displayed on the display unit 212 of the printer 200. The user performs operations, such as selection of a photographic image, by use of an input device, such as buttons connected to the IO I/F 213, while seeing the UI displayed thereon. In the UI, a photographic image taken with the digital camera 100 is read and displayed based on the photographic image data D201 input in step S206. In other words, the CPU 201 allows the display unit 212 to display the UI, and allows the user to select an image to be subjected to predetermined image processing, such as correction, from photographic images taken with the digital camera 100. Additionally, in step S206, the user sets conditions necessary for printing, such as printing paper, printing quality, and selection of an image correction function.

In step S207, the CPU 201 analyzes pieces of photographic information (data) about images selected in step S206 one by one.

In step S208, the CPU 201 analyzes a photographic image with respect to image data decoded in JPEG in step S206, and determines a correction manner by using face coordinate data D202 described later, and corrects images in accordance with this correction manner. Although image correction that does not use the face coordinate data D202 is also performed in the actual image correction, a description of this is omitted here.

In the image correction step S208, face-specific correction is performed by using the face coordinate data D202. It is possible to perform processing in which, for example, a face is corrected so as to obtain an optimal correction result by applying color information, such as the brightness, tone, and color saturation of a face region, to the face.

Figure 10:
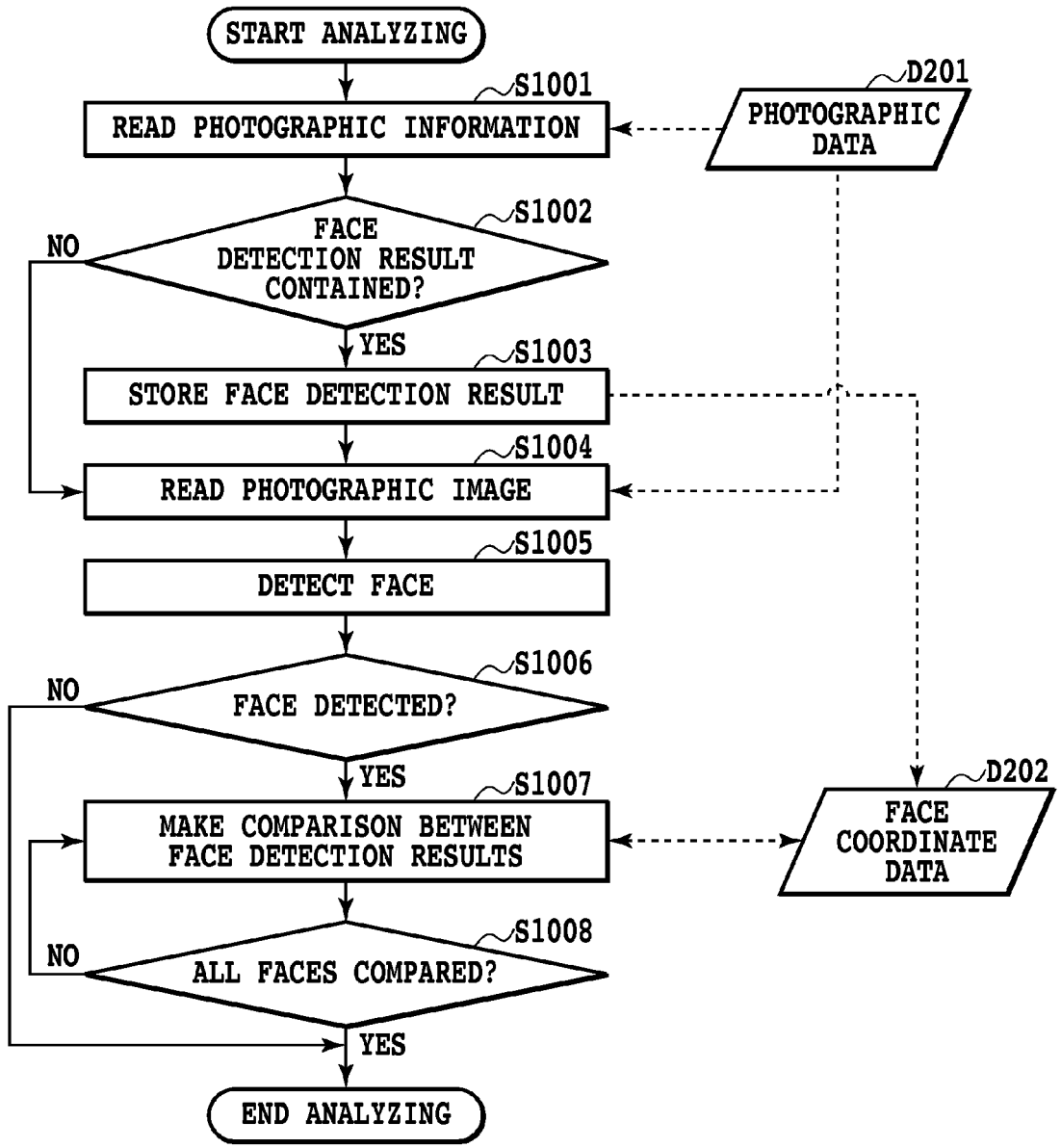
FIG. 10 is a flowchart that illustrates processing of a printer when a photographic image is analyzed according to the embodiment of the present invention.

Operations performed in steps S207 and S208 will be described with reference to FIG. 10. In FIG. 10, the processing of steps S1001 to S1003 is performed in step S207, and the processing of steps S1004 to S1008 is performed in step S208.

A selected image is converted into the Exif file structure of FIG. 5 from the photographic image data D201. Therefore, in step S1001, the CPU 101 analyzes an Exif tag that is photographic information. In step S1001, a face detection result in the maker tag (Exif tag) of FIG. 8 is searched. In step S1002, the CPU 201 determines whether the face detection result is contained in the maker tag, and hence determines whether the face detection result is contained in the photographic image data D201 selected in step S206. If it is determined in step S1002 that the face detection result is contained in the maker tag, the process proceeds to step S1003.

In step S1003, the face detection result (which is also referred to as the "first face detection result") stored in the photographic image data D201 is stored in a storage area of the face coordinate data D202 of the RAM 203 in the printer 200. If all face detection results of the photographic image data D201 are stored in step S1003, and if it is determined in step S1002 that there is no face detection result, the process proceeds to step S1004.

In step S1004, the CPU 201 reads the image data (compressed data) 501g of the photographic image data D201, the DQT 501c, and the DHT 501d, and obtains analyzable image data by decoding the JPEG-compressed image data. This decoded image data is stored in a decoded-image storage area of the RAM 203.

In step S1005, the CPU 201 executes face detection processing with respect to the image data obtained in step S1004 and stored in the RAM 203 in the same way as the image processing 106 of the digital camera 100. As a result, the printer 200 can obtain a second face detection result that is a second main-subject detection result by the printer 200.

If no face has been detected in step S1006 as a result of the face detection processing performed in step S1005, the CPU 201 applies predetermined processing to the above-mentioned image data, and completes step S208. If a face has been detected in step S1006, the process proceeds to step S1007.

In step S1007, the CPU 201 makes a comparison between face region coordinates of the digital camera 100 and face region coordinates of the printer 200. What is compared in step S1007 is all detection results (second face detection results) in the printer 200 detected in the face detection step S1005 and all face detection results (first face detection results) in the digital camera 100 stored in the face coordinate data D202.

In step S1008, the CPU 201 determines whether the comparison of all face detection results has been completed in the face coordinate data D202. If the comparison thereof has not been completed, the process returns to step S1007. If the comparison of all face detection results has been completed, the CPU 201 performs the steps of FIGS. 11, 13, and 15 described later, then determines a correction manner based on the first and second face detection results, and performs image correction processing in accordance with the determined correction manner.

It is also possible to write face coordinate data detected by the printer 200 onto the face coordinate data D202 in step S1007.

In step S209, the CPU 201 performs processing to print the image data corrected in step S208.

The CPU 201 repeatedly executes steps S206 to 3209 until the printing of the photographic image selected in step S206 is completed. If the printing is completed, the process proceeds to step S211. In step S211, the CPU 201 allows the display unit 212 to display the UI, and allows the user to selectively determine whether the face coordinate data detected by the printer 200 is rewritten into photographic data. If the face coordinate data is not rewritten thereto, a direct printing operation is ended. If it is selectively determined that the face coordinate data is rewritten thereinto, the process proceeds to step S212, where the CPU 201 writes the face coordinate data D202 onto the memory card 300, in which the photographic image data D201 is stored, (i.e. the CPU 201 writes the face coordinate data 202 onto the maker tag of the Exif tag) and the process is ended.

In the above description, the direct printing system is employed in which the digital camera 100 is used as an input device (first image processing apparatus) and in which the printer 200 is used as an output device (second image processing apparatus). However, the embodiment of the present invention is not limited to this.

The present invention may be applied to a system including a plurality devices (e.g., PC host computer, interface device, and reader). For example, a first image processing apparatus that obtains image data (photographic image data D201 in the above description) to be subjected to correction processing may be a PC connected to the printer 200 via a network. In this case, for example, the printer 200 can receive image data from the first image processing apparatus, such as a PC, via the IO I/F 213, or can obtain image data from a storage medium, such as the memory card 300, via the memory I/F 204. In this case, it is recommended to allow the image data to contain information that shows a detection result of a main subject (e.g., first face detection result) detected by the first image processing apparatus (i.e., information used to show whether the one that has been detected in a predetermined area of the image data is a main subject). If so, the second image processing apparatus, such as the printer 200, can obtain a detection result of the main subject in the first image processing apparatus.

Additionally, the second image processing apparatus is not limited to the printer, and may be, for example, a PC or a similar apparatus. Additionally, the second information processing apparatus may be an apparatus (e.g., a copying machine or a facsimile machine) consisting of a single piece of equipment.

Additionally, the present invention is not limited to a form in which image data obtained by the first image processing apparatus is corrected by the second image processing apparatus. In the above description, with respect to predetermined image data obtained by the first image processing apparatus, the second image processing apparatus determines whether a first main subject obtained by the first image processing apparatus coincides with a second main subject obtained by the second image processing apparatus. Thereafter, based on a determination result, the second image processing apparatus determines a correction manner in such a way as in first to third embodiments described later, and performs image-data correction processing. According to one embodiment of the present invention, the process ranging from image-data acquisition to image-data correction may be performed by the same apparatus. For example, a main subject may be detected by use of pre-photography data and post-photography data in the digital camera 100. In this case, it is recommended to allow the digital camera 100 to make a comparison between a main subject detected before photography and a main subject detected after photography, and determine a correcting method in accordance with a comparison result.

As described above, the essential part of the present invention does not reside in where image data to be corrected is obtained, and does not reside in where image data is corrected. In the present invention, it is important to make a comparison between a first detection result and a second detection result obtained at a place (i.e., image processing apparatus) differing from that of the first detection result or obtained in a situation differing from that of the first detection result, then determine a correcting method (various parameters) based on a comparison result, and correct image data according to the determined correcting method. The first detection result mentioned above is a detection result detected by first main subject detection processing in image data to be corrected. For example, the first detection result is a main subject obtained by the first image processing apparatus or a detection result of a main subject obtained at pre-photography timing (first situation). On the other hand, the second detection result is detected by second main subject detection processing with respect to the image data mentioned above at a place or in a situation differing from that in the first main subject detection processing mentioned above. For example, the second detection result is a main subject obtained by the second image processing apparatus or a detection result of a main subject obtained at post-photography timing (second situation differing from the first situation).

Additionally, in the above description, a detection result of a main subject (face detection result) obtained by the first image processing apparatus is contained in image data. Therefore, the second image processing apparatus obtains this image data, and a detection result of a main subject by the first image processing apparatus is obtained from this image data. However, a method for obtaining the detection result of the second image processing apparatus is not limited to this. For example, a form differing from the image data may be moved from the first image processing apparatus to the second image processing apparatus via a storage medium, such as a memory card, a cable, or a network. Additionally, if the first image processing apparatus is connected to the second image processing apparatus via a network, the following form may be employed. In detail, the second image processing apparatus may transmit a command to the first image processing apparatus, and, according to this command, the first image processing apparatus may transmit a detection result obtained by the first image processing apparatus to the second image processing apparatus.

(First Embodiment)

Figure 11:
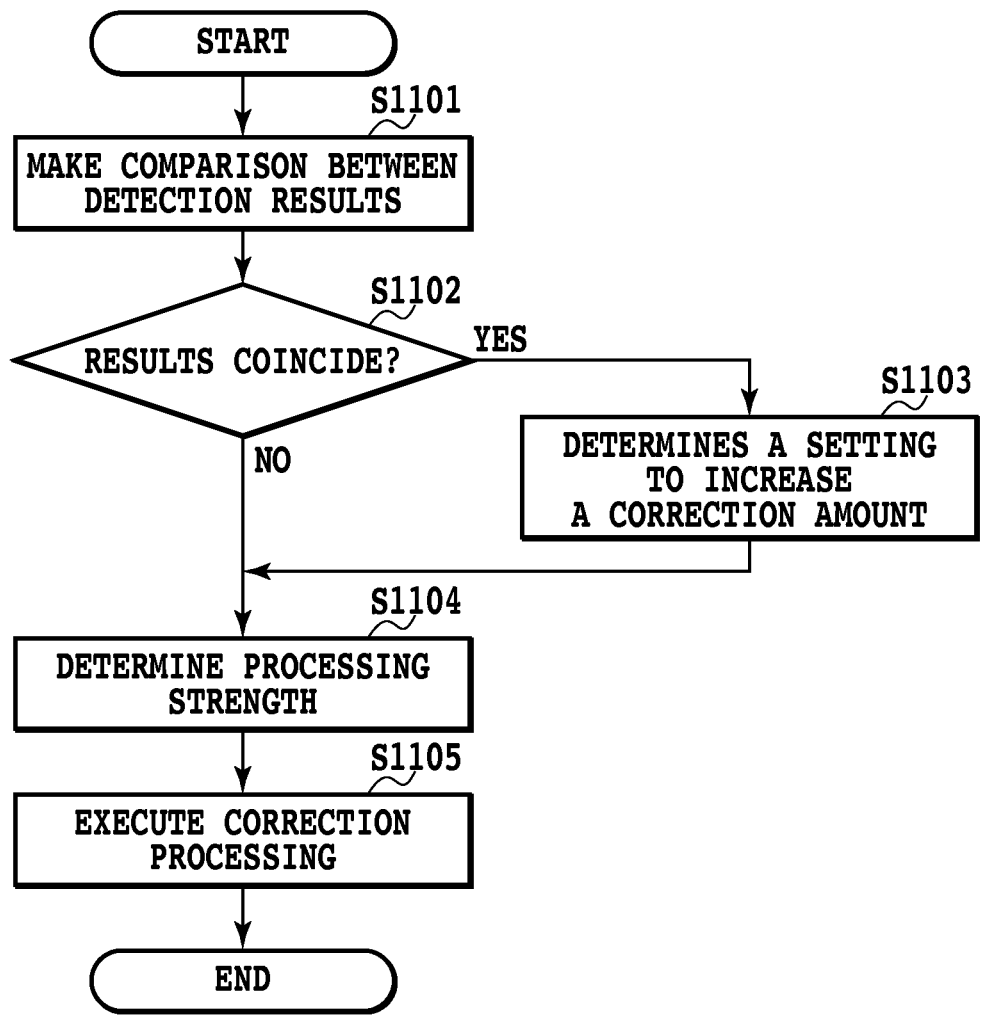
FIG. 11 is a flowchart that illustrates processing to calculate processing weight in processing that uses face detection results of the digital camera and the printer according to the embodiment of the present invention.

FIG. 11 is a process flowchart that uses a face detection result of the digital camera 100 and a face detection result of the printer 200 according to a first embodiment of the present invention. FIG. 11 shows details of the processing performed in step S208 of FIG. 2.

In step S1101, the CPU 201 makes a comparison between a face detection result of the digital camera 100 and that of the printer 200. The processing of step S1101 is the processing of from step S1004 to step S1008 of FIG. 10.

In step S1102, based on a result obtained by the comparison between a first face detection result (corresponding to the digital camera 100) and a second face detection result (corresponding to the printer 200) performed in step S1101, the CPU 201 determines whether both results coincide with each other. In other words, based on the face coordinate data D202 (first face detection result) and the second face detection result, the CPU 201 determines whether coordinates, which indicate a face, detected by the digital camera 100 and coordinates, which indicate a face, detected by the printer 200 coincide with each other. The CPU 201 makes a comparison between the first face detection result and the second face detection result in this way, and can determine whether the face region detection by the digital camera 100 coincides with the face region detection by the printer 200.

If it is determined in step S1102 that both results coincide with each other, high reliability is placed on the fact that a face region exists in an area indicated by the first and second face detection results. Therefore, in step S1103, the CPU 201 determines a setting to increase the (i.e., to increase a correction amount) correction processing using the detected face region, and the process proceeds to step S1104.

On the other hand, if the face detection result of the digital camera 100 and that of the printer 200 do not coincide with each other, low reliability is placed on the fact that a face region exists in an area indicated by the first and second face detection results. In this case, the CPU 201 does not determine a setting to increase the amount of correction processing using the detected face region, and the process proceeds to step S1104.

In step S1104, the CPU 201 determines processing strength, i.e., the amount of correction. In detail, if it is determined that both results coincide with each other and if a determination is made to perform a setting to increase the amount of correction processing, the amount of processing is set high. On the other hand, if it is determined that both results do not coincide with each other and if a determination is not made to perform a setting to increase the amount of correction processing is set low. Therefore, if the first face detection result does not coincide with the second face detection result, the amount of correction processing is lower than in a case in which the first face detection result coincides with the second face detection result. Accordingly, the CPU 201 can determine the manner of correction processing (i.e., an amount of processing using a face region in this embodiment) in accordance with whether the first face detection result and the second face detection result coincide with each other.

In step S1105, the CPU 201 performs actual correction processing in accordance with the amount of processing determined in step S1104.

A concrete correction processing method performed in step S1105 is determined in accordance with features of an image, such as brightness, color tone, and saturation in a face region, and is performed with the correction processing strength fixed in step S1104.

As an example, a method will be described of giving a weight difference to the amount of processing in accordance with reliability on a detection result although various methods can be employed to set an amount of processing in step S1104. In detail, a case will be described in which, if the first and second face detection results coincide with each other, weight having a high value is given, and, if the first and second face detection results do not coincide with each other, weight having a low value is given.

FIG. 12 illustrates a relationship between processing weight and face detection results of the digital camera 100 and the printer 200.

In FIG. 12, the area enclosed with a rectangle is a face detection region 1201. Therefore, coordinate information about the face detection region 1201 is shown as a face detection result. If there is no face detection region 1201, this means that the face has not been able to be detected.

As is ascertained from FIG. 12, if both the digital camera 100 and the printer 200 have been able to detect the face, the first face detection result coincides with the second face detection result, and the weight of correction processing using the face region is "1." Accordingly, the CPU 201 determines high reliability in step S1104, and sets an increased amount of correction processing. On the other hand, if either the digital camera 100 or the printer 200 has been able to detect the face, the first face detection result does not coincide with the second face detection result, and the weight of correction processing is "0.5." Accordingly, the CPU 201 determines low reliability in step S1104 and sets the amount of correction using the face region to be less than in a case in which the first face detection result coincides with the second face detection result. If neither the first face detection result nor the second face detection result has been obtained, the weight of correction processing is "0," which is lower than in a case in which the first face detection result does not coincide with the second face detection result.

If the face-detection reliability is low, defects will occur due to applying the wrong correction processing. For example, an image will be extremely darkened or brightened, or color balance will be lost. Therefore, a strong correction cannot be performed when there is a possibility that a great change will occur. Therefore, to decrease the influence of these defects, conventional processing has been conducted at less than an ideal amount of correction processing.

In contrast, in this embodiment, it is determined whether the first and second face detection results coincide with each other. Thereafter, the face detection reliability of the digital camera 100 and that of the printer 200 are calculated, and a correction processing method is determined in accordance with the level of the reliability. In other words, if the reliability is high, correction is performed by setting a high level (amount) of correction, and, if the reliability is low, correction is performed by setting the amount of correction to a low level. Therefore, optimal processing conditions can be determined in accordance with whether a detection result obtained by first main subject detection processing (herein, first face detection result) coincides with a detection result obtained by second main subject detection processing (herein, second face detection result). Therefore, a main subject contained in an image to be output can be output as a high quality image.

As described above, according to this embodiment, the reliability of a face region can be obtained from both the face detection result of the digital camera 100 and that of the printer 200, and hence correction processing can be performed with more ideal processing strength.

(Second Embodiment)

Figure 13:
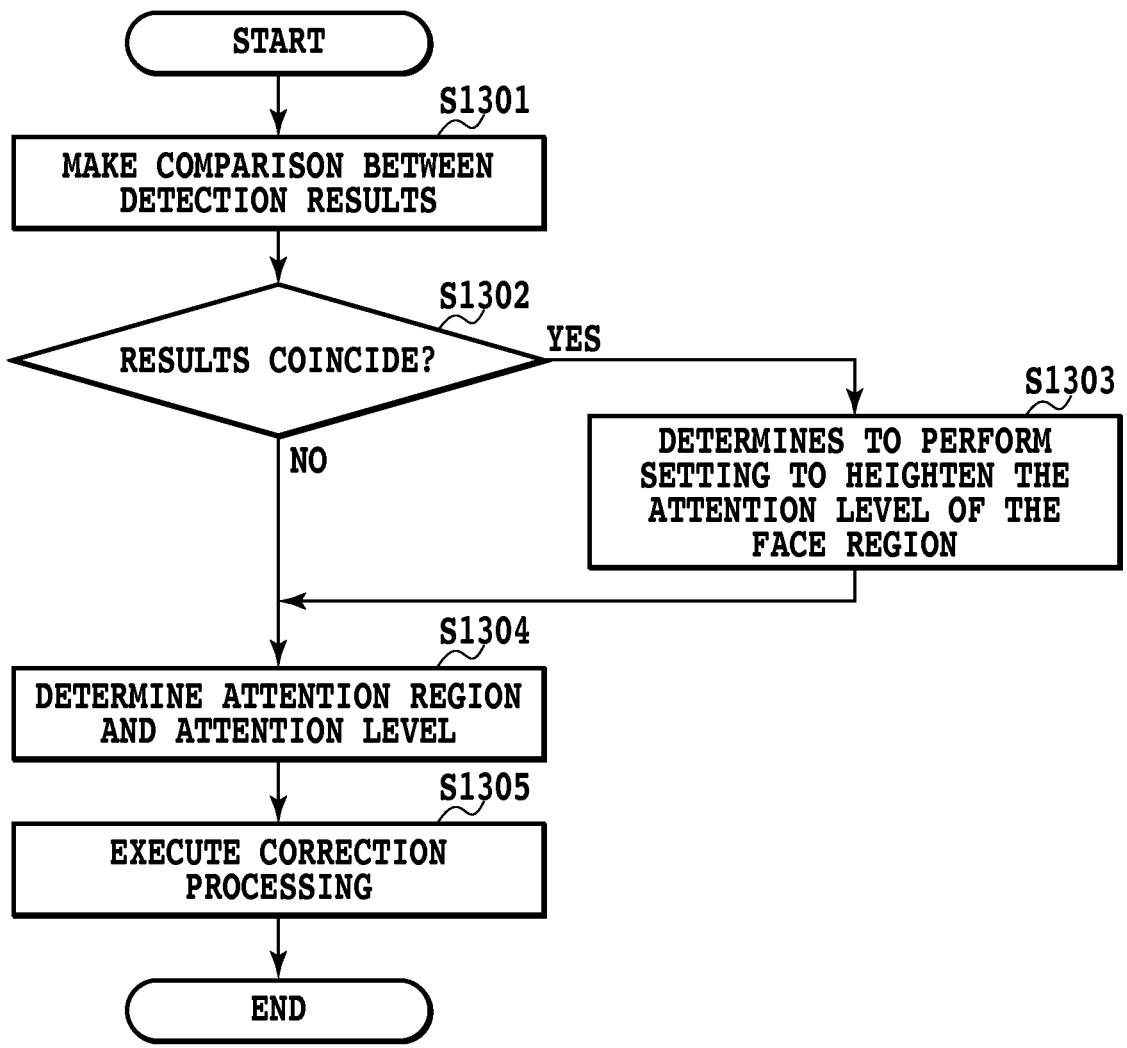
FIG. 13 is a flowchart that illustrates processing to calculate a weight of a face region in processing that uses face detection results of the digital camera and the printer according to another embodiment of the present invention.

FIG. 13 is another flowchart that illustrates processing that uses a face detection result of the digital camera 100 and a face detection result of the printer 200 according to a second embodiment of the present invention. FIG. 13 shows details of the processing of step S208 of FIG. 2.

In FIG. 13, a plurality of faces (main subjects) are contained in an image to be corrected. Therefore, the digital camera 100 and the printer 200 manage their face detection results by giving an ID number to each of the detected face.

In step S1301, the CPU 201 makes a comparison between a face detection result of the digital camera 100 and that of the printer 200. The processing of step S1301 is the processing of from step S1004 to step S1008 of FIG. 10. In step S1302, the CPU 201 determines whether each first face detection result detected above coincides with each second face detection result detected above. If it is determined that the first and second face detection results coincide with each other, the process proceeds to step S1303. In step S1303, concerning the region where the first and second face detection results coincide with each other, the CPU 201 determines to perform setting to heighten the attention level of the face region used for correction while placing high reliability on the face detection results.

On the other hand, if it is determined that the face detection result of the digital camera 100 does not coincide with that of the printer 200, the process proceeds to step S1304 without determining to perform setting to heighten the notice level of the face region used for correction.

In this description, the term "notice level" denotes a standard for determining weight with which correction processing is performed. The weight becomes greater in proportion to an increase in the notice level. In this embodiment, if a region in an image to be corrected is detected as a face region both in the digital camera 100 and in the printer 200, high reliability is placed on the face detection, and hence, in order to set the weight of this region to be high, the notice level is set to be high. On the other hand, if a region in an image to be corrected is detected as a face region either in the digital camera 100 or in the printer 200, low reliability is placed on the face detection, and hence, in order to set the weight of this region to be low, the notice level is set to be low.

In step S1304, the CPU 201 determines an attention region indicating a face and a notice level of the attention region. In other words, the CPU 201 determines that a region in which at least one of the first and second face detection results has been detected is an attention region. Therefore, this attention region is a region detected as a face region by the digital camera 100 and/or the printer 200. Thereafter, the CPU 201 sets an notice level for each attention region in accordance with whether the first and second face detection results coincide with each other, i.e., in accordance with reliability. In this embodiment, concerning a region in which the first and second face detection results coincide with each other, a determination is made to set the notice level to be high in step S1303. Therefore, in step S1304, the CPU 201 sets the notice level of an attention region having such a high notice level to be high. On the other hand, the notice level of a region in which the first and second face detection results do not coincide with each other is set to be lower than that of a region in which the first and second face detection results coincide with each other. The CPU 201 can determine a correcting method in this way.

In step S1305, the CPU 201 performs actual correction processing by using the notice level (weight) set in step S1304. The amount (level) of correction used for this correction processing can be obtained, for example, by calculating the product of weight set for each attention region and a predetermined amount of correction, then adding the resulting figures together, and dividing the sum by the number of attention regions.

Additionally, the correction processing method executed in step S1305 is determined by features of an image, such as brightness, color tone, saturation, etc., in the attention region to which the notice level fixed in step S1304 has been added.

Figure 14:
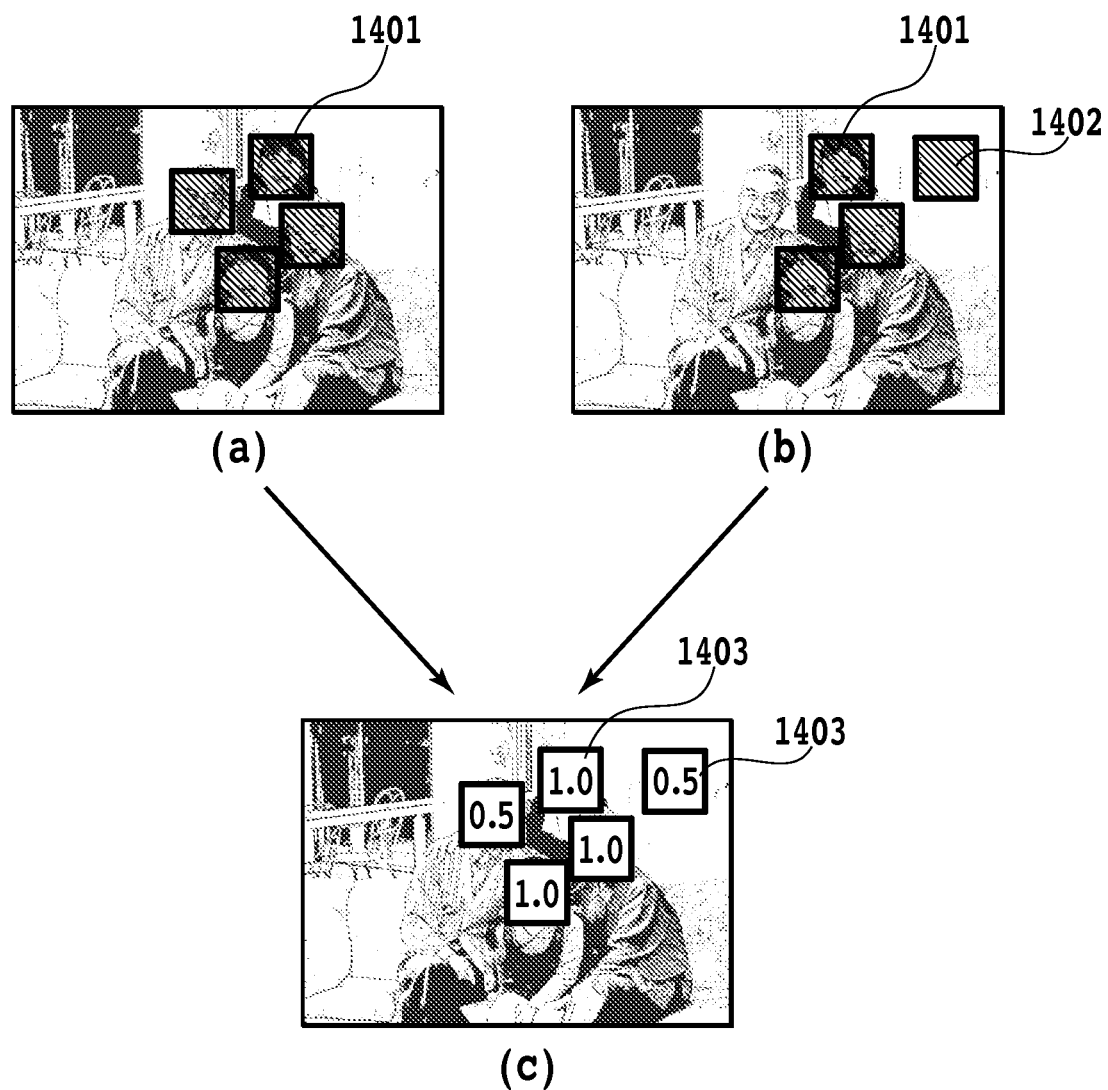
FIG. 14 is view that illustrate a relationship between the weight of a face region and face detection results of the digital camera and the printer.

FIG. 14 illustrate face detection results of the digital camera 100 and the printer 200 and values of weight of face regions. FIG. 14(a) is a view illustrating a first face detection result obtained by the digital camera 100, and FIG. 14(b) is a view illustrating a second face detection result obtained by the printer 200.

A region part enclosed with a rectangle is a face detection region 1401 in each of FIGS. 14A and 14B. If there is no face detection region 1401, this means that no face has been detected. In this example, a false detection region 1402 also exists in FIG. 14(b) showing a detection result of the printer. FIG. 14(c) is a view that illustrates numerical values of weight of face regions calculated from the first detection result of the digital camera 100 (FIG. 14(a)) and the second detection result of the printer 200 (FIG. 14(b)).

As is ascertained from FIG. 14(c), if the detection result of the digital camera 100 coincides with the detection result of the printer 200, this shows that high reliability is placed on the face detection, and hence the notice level of its attention region is set to be high. Therefore, the weight of the face region is "1." On the other hand, if the detection result of the digital camera 100 does not coincide with the detection result of the printer 200, there is a case in which, for example, the printer 200 has detected the false detection region 1402, and hence low reliability is placed on the face detection. Therefore, the weight of the face region is lower than in a case in which the detection result of the digital camera 100 coincides with the detection result of the printer 200, and the weight of the face region is, for example, "0.5."

For example, the image of FIG. 14(*c*) has five attention regions therein, and the sum of weight set for each attention region is 4(=0.5+0.5+1+1+1). The sum "4" is divided by 5, which is the number of attention regions, and, as a result, 0.8, which is weight, is obtained. Accordingly, when correction processing is performed by using the detected face regions, the degree (level) of processing is 0.8.

According to this embodiment, face region reliability is obtained from both the face detection result of the digital camera 100 and the face detection result of the printer 200 as in the same way as in the first embodiment, and hence it is possible to perform correction processing by more ideal processing details.

Additionally, in this embodiment, it is possible to reflect face region reliability that exerts influence on correction processing details although the correction strength is controllably varied in the first embodiment.

(Third Embodiment)

Figure 15:
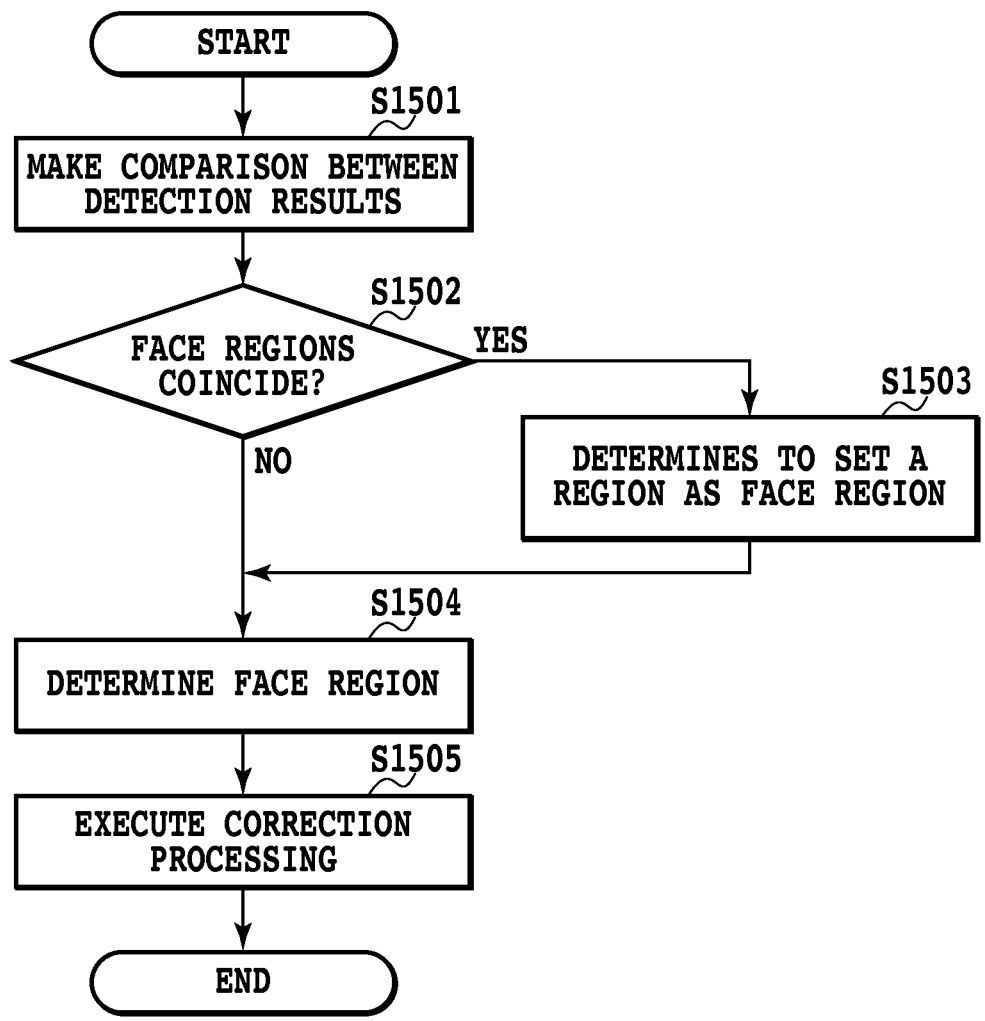
FIG. 15 is a flowchart that illustrates processing to extract a face region used for correction in processing that uses face detection results of the digital camera and the printer according to another embodiment of the present invention.

FIG. 15 is another flowchart that illustrates processing using face detection results of the digital camera and the printer according to a third embodiment of the present invention. FIG. 15 shows details of the processing of step S208 of FIG. 2.

In step S1501, the CPU 201 makes a comparison between a face detection result of the digital camera 100 and that of the printer 200. The processing of step S1501 is the same as the processing of step S1004 to step S1008 of FIG. 10.

In step S1502, from a result of a comparison between the first face detection result and the second face detection result, the CPU 201 determines whether the results of both face detection regions coincide with each other. In other words, referring to the first face detection result and the second face detection result, the CPU 201 determines whether the position of a face region detected by the digital camera 100 coincides with the position of a face region detected by the printer 200. If the position of the face region detected by the digital camera 100 coincides with that detected by the printer 200, the CPU 201 determines, in step S1503, to set a region having a coincidence between both positions as a main subject region (face region) used for correction processing.

On the other hand, a region part in which the result of the face detection region of the digital camera 100 does not coincide with that of the printer 200 is not set as a face region used for correction processing.

In step S1504, after a comparison between the face detection result of the digital camera 100 and that of the printer 200, the CPU 201 determines a face region used for correction processing. In other words, if the first and second face detection results completely coincide with each other, the CPU 201 sets a face region specified by the first face detection result and by the second face detection result as a face region used for correction processing. On the other hand, if the first and second face detection results do not completely coincide with each other, i.e., if one of the first and second face detection results is contained in the other, a region in which the first and second face detection results are overlapped with each other is set as a face region used for correction processing. Accordingly, in accordance with whether the first and second face detection results coincide with each other, the CPU 201 can determine a correction processing method (herein, a method determined based on the fixation of a face region used for correction processing).

In step S1505, the CPU 201 performs actual correction processing according to a correction processing method determined based on the face region fixed in step S1504. Additionally, although the correction processing method executed in step S1505 is determined by attaching great importance to features of an image, such as brightness, color tone, saturation, etc., in a face region, it becomes possible to obtain a more accurate correction result by determining correction processing details based on a face region having high reliability.

Figure 16:
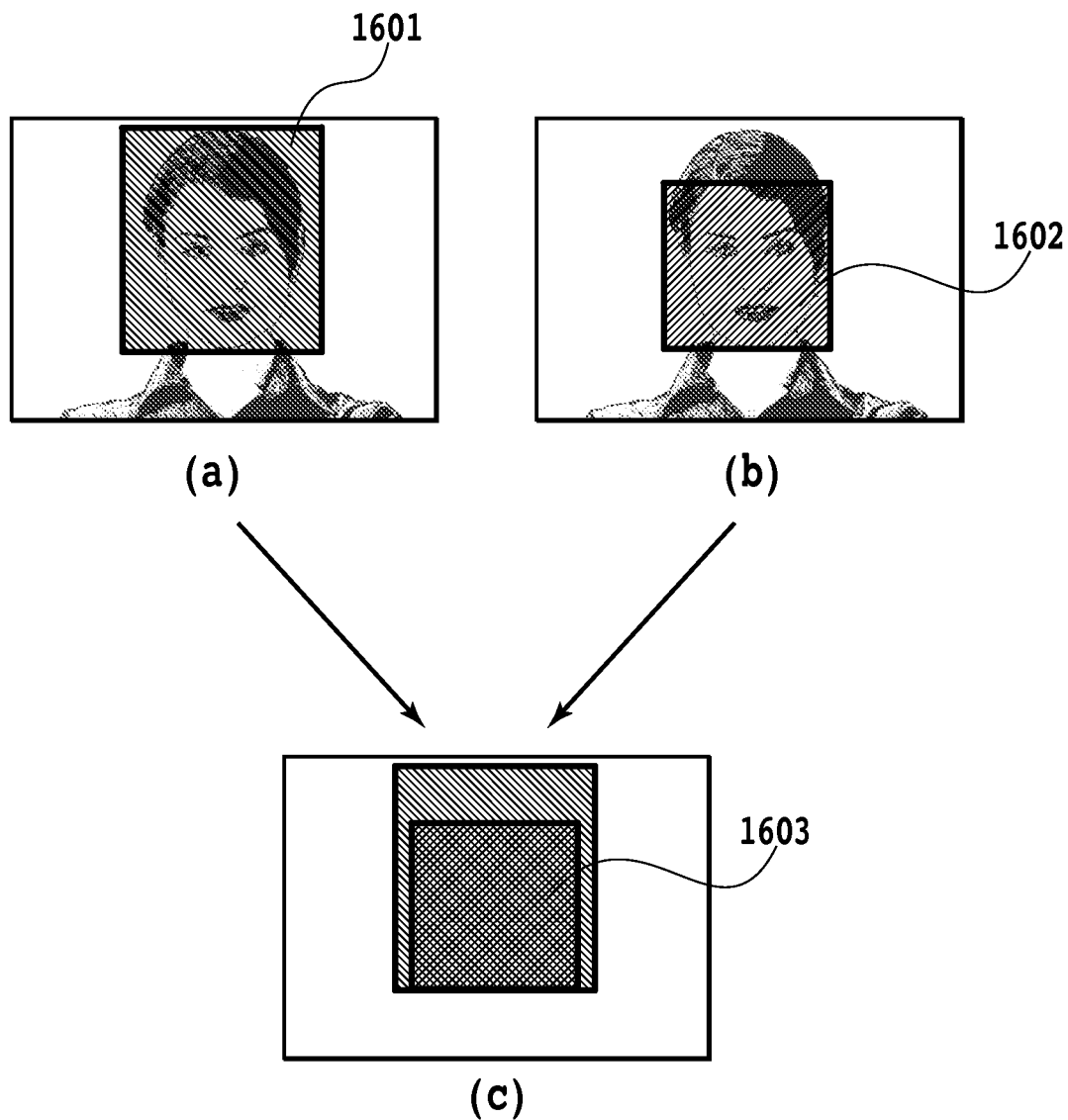
FIG. 16 is view that illustrate a relationship between a face region used for correction and face detection results of the digital camera and the printer according to the embodiment of the present invention.

FIG. 16(*a*) illustrates a first face detection result obtained by the digital camera 100, and FIG. 16(*b*) is a view that illustrates a second face detection result obtained by the printer 200. Region parts each of which is enclosed with a rectangle in FIG. 16(*a*) and FIG. 16(*b*) are face detection regions 1601 and 1602, respectively. FIG. 16(*c*) is a view in which face regions obtained from the first detection result of the digital camera 100 (FIG. 16(*a*)) and from the second detection result of the printer 200 (FIG. 16(*b*)) are overlapped with each other.

As is ascertained from FIG. 16(*c*), the face region 1601 detected by the digital camera 100 and the face region 1602 detected by the printer 200 differ from each other in the face region detected thereby. This difference in the face region is caused by a difference in algorithm for detection resulting from a difference in the purpose of use between the digital camera 100 and the printer 200.

In this embodiment, a region 1603 in which regions detected by the digital camera 100 and the printer 200 are overlapped with each other is reflected as a face region result to be finally used for correction processing (i.e., as a face region to be corrected).

According to the method of this embodiment, face region reliability can be obtained with higher accuracy from both face detection results of the digital camera 100 and the printer 200, and hence it becomes possible to perform correction processing with more ideal processing details.

(Other Embodiments)

The present invention can be applied to a system consisting of a plurality of pieces of equipment (e.g., computer, interface device, reader, and printer), and also to an apparatus consisting of a single piece of equipment (e.g., multi function device, printer, and facsimile machine).

The scope of the above-mentioned embodiments also contains a processing method in which a program, which controls the structures mentioned in the above embodiments so as to fulfill the functions mentioned in the above embodiments, is stored in a storage medium, is then read as a code, and is executed in a computer. In other words, a computer-readable storage medium is also contained in the scope of the above embodiments. Additionally, the computer program, as well as the storage medium in which the computer program is stored, is contained in the scope of the above embodiments.

For example, a floppy (registered trademark) disk, a hard disk, an optical disk, a magneto-optical disk, a CD-ROM, a magnetic tape, a nonvolatile memory card, and a ROM can be used as the storage medium.

Additionally, other software in which operations mentioned in the above embodiments are executed while being conducted on an OS in cooperation with the function of an extended board is also contained in the scope of the above embodiments without being limited to a system in which processing is performed by the single program stored in the above-mentioned storage medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-166255, filed Jun. 25, 2008, which is hereby incorporated by reference herein in its entirety.

What is claimed is:

1. An image processing apparatus comprising:
   an obtaining unit configured to obtain photographic data including (a) image data and (b) a detection result obtained by main subject detecting processing in an input device, wherein the input device is separate from the image processing apparatus;
   a detecting unit configured to apply main subject detecting processing to the image data in the photographic data obtained by the obtaining unit;
   a comparing unit configured to compare (a) the detection result obtained by main subject detecting processing in the input device, which is in the photographic data obtained by the obtaining unit, with (b) a detection result obtained by the detecting unit;
   a determining unit configured to determine an amount of correction in correction processing applied to the image data in accordance with the comparison result obtained from the comparing unit; and
   a correcting unit for correction processing that uses the determined amount of correction applied to the image data,
   wherein the input device is a camera, and the image processing apparatus is a printer.

2. The image processing apparatus according to claim 1, wherein if it is determined by the determining unit from the comparison result obtained from the comparing unit that the detection result obtained by main subject detecting processing in the input device coincides with the detection result obtained by the detecting unit, the amount of correction is determined to be greater than in the case where it is determined that the detection result obtained by main subject detecting processing in the input device does not coincide with the detection result obtained by the detecting unit.

3. The image processing apparatus according to claim 1, wherein if a plurality of main subjects are detected by the detecting unit in the image data, the comparing unit compares the detection result obtained by main subject detecting processing in the input device, which is in the photographic data, with the detection result obtained by the detecting unit for each of the plurality of main subjects, and the determining unit determines the weight for each of the plurality of main subjects in accordance with the comparison result of the comparing unit and determines the amount of correction in the correction processing applied to the image data by dividing the sum of the weight determined for each main subject by the number of the main subjects detected by at least one of the input device and the detecting unit.

4. The image processing apparatus according to claim 1, wherein the determining unit determines a region of the main subject used for the correction processing based on the detection result obtained by main subject detecting processing in the input device and the detection result obtained by the detecting unit, and
   wherein the correcting unit performs correction processing for the determined main subject region.

5. An image processing method comprising the steps of:
   obtaining, by an image processing apparatus, of photographic data including (a) image data and (b) a detection result obtained by main subject detecting processing in an input device, wherein the input device is separate from the image processing apparatus;
   applying, by the image processing apparatus, main subject detecting processing to the image data in the photographic data obtained by the obtaining step;
   comparing (a) the detection result obtained by main subject detecting processing in the input device, which is in the photographic data obtained by the obtaining step, with (b) a detection result obtained by the applying step;
   determining an amount of correction in correction processing applied to the image data in accordance with the comparison result obtained from the comparing step; and
   performing a correction processing that uses the determined amount of correction applied to the image data,
   wherein the input device is a camera, and the image processing apparatus is a printer.

6. A program stored in a non-transitory computer readable storage medium for causing a computer to perform the image processing method according to claim 5.

7. The image processing apparatus according to claim 1, wherein the determining unit determines a correction processing method of the correcting unit for a region where a region of the main subject detected by the input device and a region of the main subject detected by the detecting unit are overlapped with each other.

* * * * *